May 25, 1937.   A. McL. NICOLSON   2,081,367
ELECTRICAL WEIGHING AND DISTRIBUTION SYSTEM
Filed Sept. 18, 1934   2 Sheets-Sheet 1
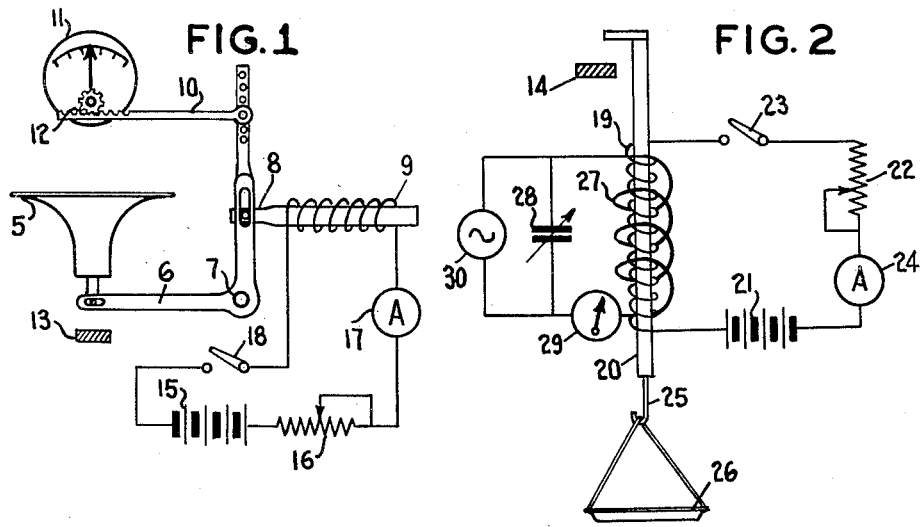
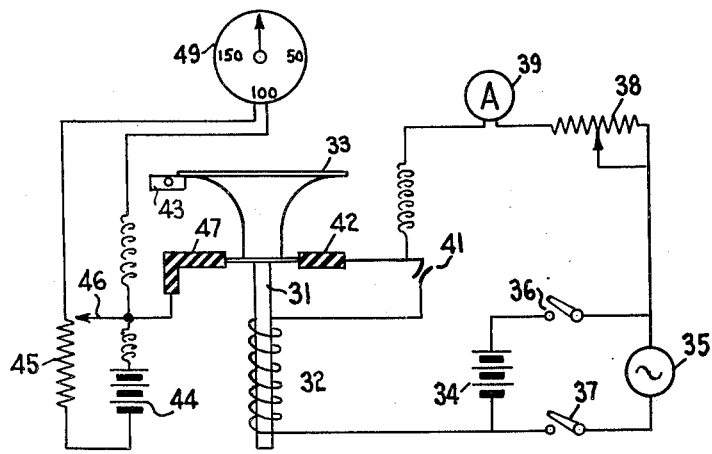
INVENTOR.
ALEXANDER McLEAN NICOLSON
BY
ATTORNEY.

May 25, 1937.  A. McL. NICOLSON  2,081,367
ELECTRICAL WEIGHING AND DISTRIBUTION SYSTEM
Filed Sept. 18, 1934  2 Sheets-Sheet 2

INVENTOR.
ALEXANDER McLEAN NICOLSON
BY
*Irl R. Gloshaw*
ATTORNEY.

Patented May 25, 1937

2,081,367

UNITED STATES PATENT OFFICE 2,081,367

ELECTRICAL WEIGHING AND DISTRIBUTION SYSTEM

Alexander McLean Nicolson, New York, N. Y., assignor to Communication Patents, Inc., New York, N. Y., a corporation of Delaware Application September 18, 1934, Serial No. 744,591

2 Claims. (Cl. 177—351)

This invention relates to the application of eletricity for determining weight and for distributing indications thereof, and particularly to the use of magnetism as the reactive element in such systems.

An object of the invention is to measure the weights of objects in an accurate and simple manner.

Another object of the invention is to obtain the weight of objects in corresponding electrical current amplitude or frequency values for the operation of indicating means or for distribution to such means.

A further object of the invention is to provide a weighing device having simplified operating elements, permitting ease of adjustment at all times.

The usual form of weighing apparatus relies upon springs and levers for the reacting element while a mechanically coupled scale records the deformation of the springs or levers. For very accurate measurements balances are used which depend for their accuracy upon needle or knife edge adjustments and accurate counter weights.

The present invention contemplates the use of electrical currents to produce a magnetic field which can be brought to the same accurate value at all times. With such a controllable reactive element, the device is always accurate and particularly so when electricity is used for indicating any change in displacement of the magnetic element. With electric current proportional to weight, the indications may be easily distributed to various distant points for indication at said points or for operating recording or integrating meters. The indicating devices may be of the potentiometer, resistance or frequency type, all of which are easily adjustable to give a zero or resonance setting.

The present invention will be more clearly understood and the advantages thereof fully realized from the following description read in conjunction with the accompanying drawings in which:

Fig. 1 shows a simplified embodiment of the apparatus using a mechanical indicator;

Fig. 2 shows another embodiment of the invention employing an electrical indicator of the frequency variation type;

Fig. 3 shows a further modification employing electrical elements throughout;

Figure 4:
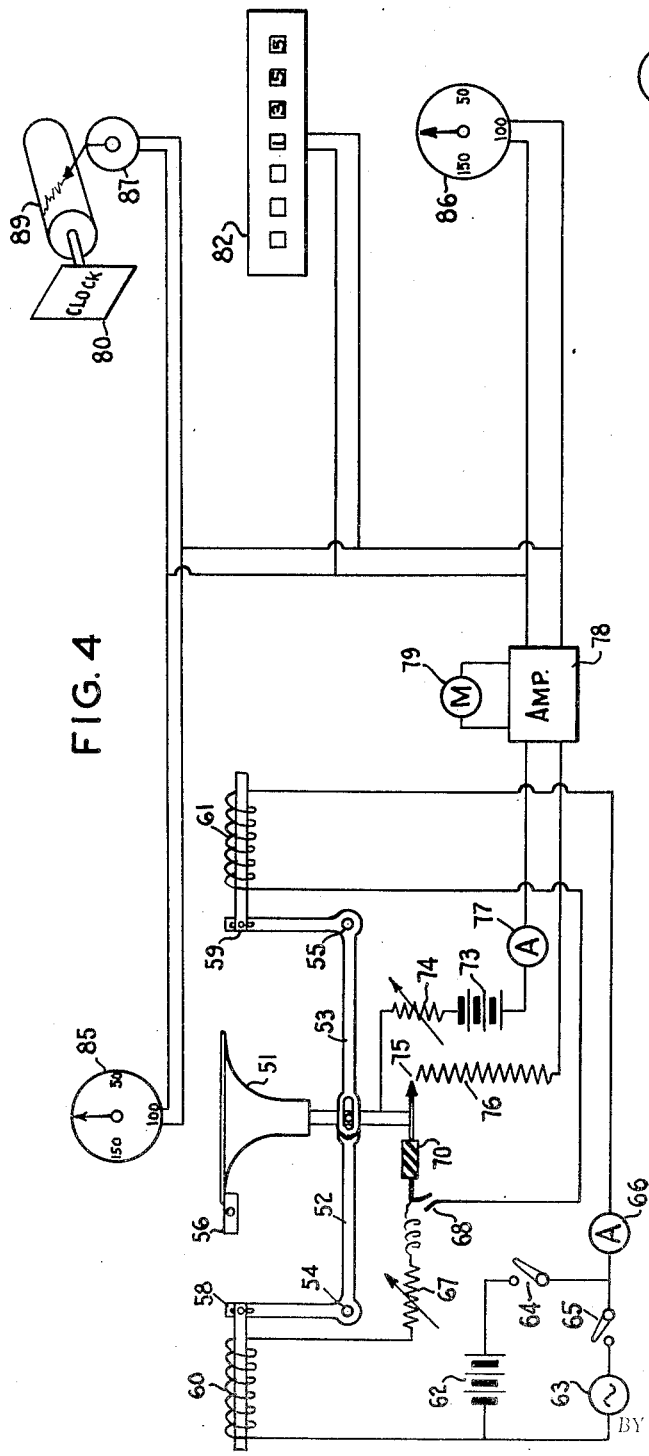
Fig. 4 shows a push-pull reactive element with an electrical distributing system.

Referring to Fig. 1, a platform 5, of any desired form of construction upon which an object can be placed, rests upon an angle lever 6, fulcrumed at 7 and connected to a magnetic armature or floating core 8 of a solenoid 9. The line cross-hatching of the core 8 shows magnetic material imbedded in a non-magnetic support, there thus being variations of flux linkage at different positions of the magnetic material along the axis of the solenoid 9. The lever 6 extends beyond the core 8 and is connected to an arm 10, which operates a meter 11 through a rack and pinion combination 12. A stop 13 provides a position of rest for the table 5.

The electrical circuit portion of Fig. 1 includes the coil of solenoid 9, a source of energy 15, rheostat 16 and an ammeter 17. In this simplified device the reactive force is obtained from the magnetic field of the solenoid 9 when the switch 18 is closed, the armature 8 resisting withdrawal from the coil. Any movement, however, is a function of the weight of the object on the platform 5 and the downward movement of the platform 5 is directly indicated on the scale 11 through arm 10 as the platform 5, armature 8 and lever 6 are integrally connected. Although the coil 9 can be so wound as to provide a substantially linear relationship between the movement of the armature and the weight of the object, it is not necessary to so construct the coil as the scale 11 can be calibrated to correspond to the particular coil used. The leverage of the arm 10 to the lever 6 is constructed to provide further adjustment. The operation of the above device appears obvious in that the coil 9 can be energized to the same value after closure of the switch 18 by the rheostat 16 and the ammeter 17, thus providing the same reactive force at all times.

In Fig. 2 a coil 19 surrounds an armature or core 20, constructed in the same manner as core 8, the coil being energized from a source 21 in series with a rheostat 22, switch 23 and ammeter 24. To the lower end of core 20 is fastened a hook 25 for supporting objects to be weighed or for supporting a scale basket 26. A block 14 provides a position of rest for the armature 20. The portion of the device just described operates in the same manner as that shown in Fig. 1. The indicating portion of the device, however, is based on frequency variation and includes a coil 27 surrounding the core 20, a variable condenser 28, ammeter 29 and frequency source 30. This frequency source may be the simple 60 cycle 110 volt house supply. The circuit comprising condenser 28 and coil 27 is tuned to resonance with condenser 28 when the armature 20 is in normal position, thus providing a maximum reading on the ammeter 29. Any movement of the core 20, however, is registered by the off resonance decrease in current which may be accurately calibrated for a particular device. Such an electrical indicating system is extremely accurate and may be used in the systems shown in Fig. 1 and the figures to be described, as well as that in Fig. 2.

Referring now to Fig. 3, a device using an electrical reactor and another type of electrical indicator is shown. A table 33 is supported by an armature 31 similar to cores 8 and 20 in a vertical coil or solenoid 32. The coil is energized from either a direct current source 34 or an alternating current source 35 controlled by switches 36 and 37, respectively. A rheostat 38 and ammeter 39 permit the proper adjustment of the current to be made to obtain the same magnetizing force in each instance. An automatic switch 41 connected through an insulator 42 permits the energization of the coil 32 only when a weight is placed upon the table 33 and the stop 43 turned to release the table 33 from its rest position.

The indicator for this measuring device is of the potentiometer type with a source of energy 44 across a potentiometer 45. A sliding contactor 46 is connected to the table 33 through an insulator 47, the voltage obtained across the potentiometer being proportional to the displacement of the platform 33. This voltage is registered upon an indicator 49 of the usual voltmeter type. This device may be calibrated by placing standard weights upon the table or may be adjusted to give a linear indication, as mentioned above.

In the weighing device disclosed in Fig. 4 a table 51 is supported at a terminal at each of the two angle arms 52 and 53, fulcrumed at 54 and 55, respectively. The other terminals of these arms being connected to armatures 58 and 59 similar to cores 8, 20 and 31 and operating in solenoids 60 and 61, respectively. This arrangement of the solenoids provides not only a heavier duty weighing device, but also a better balanced system, particularly of the electrical type. The two coils 60 and 61 are energized in series from a direct current source 62 or an alternating current source 63 connectable at will through switches 64 and 65, respectively. An ammeter 66 provides an indication of a zero adjustment which may be made with a rheostat 67. A switch 68 connected through insulator 70 to and below the table 51 always produces energization of the coil when an object is placed upon the table. The terminals of the arms 52 and 53 are slotted to permit a free upward and down motion of the table 51.

For indicating the downward displacement of the table 51, caused by the object thereon after stop 56 is turned to release table 51 from its rest position, a series electrical circuit including energy source 73, adjusting rheostat 74, contactor 75, resistance 76 and ammeter 77 is shown connected to a direct current amplifier 78. The gain of this amplifier is maintained constant by adjustment indicated on a meter 79. The output of the amplifier is shown distributed to a local scale 85 of the type shown in Fig. 3, a distant scale 86 of the same type, a recording meter 87 operating on a paper carrying cylinder 89, connected with a clock 80 for producing the time coordinate, and an integrating meter 82 for totaling the weights made over a certain period. The instruments 82, 86 and 87 may be at a considerable distance from the actual weighing device, thus providing instantaneous communication of the weight of an object at several different points, such device being particularly useful for manufacturers where raw materials are bought by loads or packages of various weights and which arrive at different times during the day. It is similarly useful for the manufactured product where shipment is based on package weight. As such articles are weighed, the values may be instantly transmitted to different departments interested therein, such as the bookkeeping department to accelerate entries and the writing up of rate checks and bills.

Figure 5:
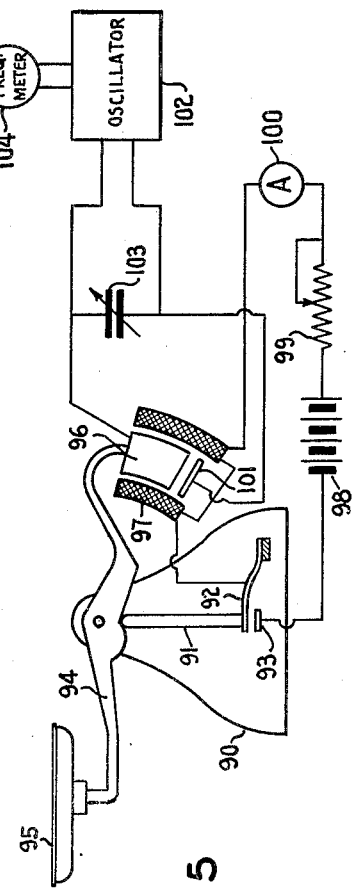
Fig. 5 shows a weighing device having a frequency variation indicator.

Referring now to Fig. 5, a support 90 has mounted thereon a rod 91 resting on a switch spring 92 having a fixed contact 93. A cross beam 94, fulcrumed on support 90, has a table or pan 95 mounted on one end and positions a metallic core 96 in a solenoid 97 at the other end. The winding of the solenoid 97 is energized from a source 98 connected through rheostat 99, ammeter 100 and switch contacts 92 and 93. This circuit provides the reactive force for the weight of the object placed on pan 95 when the object's weight closes contacts 92 and 93, the spring contact 92 being just strong enough to break contact when the pan is empty.

The indicating system includes the core 96, a fixed metallic plate 101, an oscillator 102, a variable condenser 103 for tuning the oscillator to a definite frequency and a frequency meter 104. After the indicator is calibrated, accurate measurements are made by setting the oscillator at the predetermined zero weight frequency and then noting the variation in frequency produced by the capacity change caused by the separation of the core 96 and fixed plate 101. Each value of weight will give a certain separation which will be faithfully indicated on the meter 104.

What is claimed is:

1. In a weighing device, a pair of windings having substantially common and interlinking magnetic fields, a floating magnetic core for said windings, means for passing a constant current through one of said windings to produce a magnetic field around said core, means for connecting an object to be weighed to said core, said core being constructed so as to move a distance dependent upon the weight of said object and said field resisting the movement of said core, means for passing alternating current through the second of said windings, said second winding forming part of a tuned circuit, and means in said tuned circuit for indicating the degree of detuning thereof, said detuning being proportional to the movement of said core caused by the weight of said object.

2. In a weighing device, the combination of a plurality of windings adapted to produce interlinked magnetic fields, means for passing a current of steady value through one of said windings, a magnetic core for both of said windings, said core being constructed so that any movement thereof is resisted by the field set up by said winding having said steady current flowing therethrough, a tuned circuit, the second of said windings forming a part thereof, and means connected to said tuned circuit for indicating the degree of tuning thereof.

ALEXANDER McLEAN NICOLSON.